United States Patent
Gan et al.

(10) Patent No.: US 12,240,436 B1
(45) Date of Patent: Mar. 4, 2025

(54) DRIVER TUNABLE LINEAR DRIVE MODE FOR VEHICLES

(71) Applicant: FCA US LLC, Auburn Hills, MI (US)

(72) Inventors: Quan Gan, Shanghai (CN); Xianglong Gu, Shanghai (CN); Shufei Huang, Shanghai (CN)

(73) Assignee: FCA US LLC, Auburn Hills, MI (US)

(*) Notice: Subject to any disclaimer, the term of this patent is extended or adjusted under 35 U.S.C. 154(b) by 0 days.

(21) Appl. No.: 18/599,995

(22) Filed: Mar. 8, 2024

(51) Int. Cl.
| | |
|---|---|
| *B60W 50/08* | (2020.01) |
| *B60K 35/10* | (2024.01) |
| *B60W 10/04* | (2006.01) |
| *B60W 50/00* | (2006.01) |

(52) U.S. Cl.
CPC ............ *B60W 10/04* (2013.01); *B60K 35/10* (2024.01); *B60W 50/085* (2013.01); *B60W 50/087* (2013.01); *B60K 2360/126* (2024.01); *B60W 2050/0026* (2013.01)

(58) Field of Classification Search
CPC .. B60W 10/04; B60W 50/085; B60W 50/087; B60W 2050/0026; B60K 35/10; B60K 2360/126
See application file for complete search history.

(56) References Cited

U.S. PATENT DOCUMENTS

| | | | | |
|---|---|---|---|---|
| 5,383,431 A * | 1/1995 | Nishimura | ............ | F02D 11/105 |
| | | | | 123/399 |
| 6,941,209 B2 * | 9/2005 | Liu | ..................... | B60W 30/182 |
| | | | | 701/87 |
| 7,549,649 B2 * | 6/2009 | Baldet | ................... | B60T 8/1755 |
| | | | | 74/473.31 |
| 8,165,780 B2 | 4/2012 | Russell | | |
| 9,016,168 B2 * | 4/2015 | Prokhorov | ............. | B62D 1/046 |
| | | | | 701/1 |
| 10,507,818 B2 | 12/2019 | Jeon et al. | | |
| 2008/0115761 A1 * | 5/2008 | Deguchi | ............... | F02D 11/105 |
| | | | | 123/336 |
| 2009/0292444 A1 * | 11/2009 | Russell | ................. | F02D 35/027 |
| | | | | 123/575 |
| 2014/0121929 A1 | 5/2014 | Murofushi | | |

FOREIGN PATENT DOCUMENTS

| | | | |
|---|---|---|---|
| CN | 111845595 | A | 10/2020 |
| CN | 114412988 | B | 11/2022 |
| CN | 113606329 | B | 4/2023 |
| CN | 108087541 | B | 5/2023 |
| DE | 102018201035 | A1 * | 7/2019 |

\* cited by examiner

*Primary Examiner* — Justin Holmes
(74) *Attorney, Agent, or Firm* — Jeremy J. Klobucar

(57) ABSTRACT

A drive mode control system for a vehicle includes an input device configured to receive an input from a user of the vehicle, the input being indicative of a selected linear performance index value from a linear range of performance index values between minimum and maximum performance index values and a control system configured to receive the selected linear performance index value, access predetermined powertrain settings corresponding to the minimum and maximum performance index values, linearly interpolate between the predetermined powertrain settings corresponding to the minimum and maximum performance index values based on the selected linear performance index value to obtain target powertrain settings, and control a powertrain of the vehicle based on the target powertrain settings.

17 Claims, 2 Drawing Sheets

DRIVER TUNABLE LINEAR DRIVE MODE FOR VEHICLES

FIELD

The present application generally relates to vehicle drive mode control and, more particularly, to a driver tunable linear drive mode for vehicles.

BACKGROUND

A vehicle powertrain generates and transfers drive torque to a driveline for vehicle propulsion. Conventional vehicle drive modes include a select few predetermined or preconfigured drive modes, such as Normal, Sport, and Economy or "Eco." Each of these drive modes has a different associated set of configurations or settings for the vehicle powertrain. Some vehicles, such as hybrid vehicles having hybrid powertrains including both an internal combustion engine (ICE) and one or more electric motors, are capable of operating in a wide-array of different performance and efficiency levels (ICE-only, motor-only, series and/or parallel hybrid, etc.). Accordingly, while these conventional select few preconfigured drive modes provide some degree of user/driver customization or flexibility in the controlling or adjusting of the vehicle drive mode on the fly and generally work for their intended purpose, there remains an opportunity for improvement in the relevant art.

SUMMARY

According to one example aspect of the invention, a drive mode control system for a vehicle is presented. In one exemplary implementation, the drive mode control system comprises an input device configured to receive an input from a user of the vehicle, the input being indicative of a selected linear performance index value from a linear range of performance index values between minimum and maximum performance index values and a control system configured to receive the selected linear performance index value, access predetermined powertrain settings corresponding to the minimum and maximum performance index values, linearly interpolate between the predetermined powertrain settings corresponding to the minimum and maximum performance index values based on the selected linear performance index value to obtain target powertrain settings, and control a powertrain of the vehicle based on the target powertrain settings.

In some implementations, the minimum powertrain index value corresponds to a relative lowest performance powertrain settings or a relative highest efficiency powertrain settings, and the relative performance of the corresponding powertrain settings increases or the relative efficiency of the corresponding powertrain settings decreases as the performance index value increases from the minimum performance index value towards the maximum performance index value. In some implementations, the predetermined and target powertrain settings include an accelerator pedal mapping. In some implementations, the powertrain includes a torque generating system configured to generate torque and a multi-speed transmission configured to transfer the torque from the torque generating system to a driveline of the vehicle, and the predetermined and target powertrain settings further include a transmission shift mapping.

In some implementations, the powertrain includes a torque generating system configured to generate torque and a multi-speed transmission configured to transfer the torque from the torque generating system to a driveline of the vehicle, and the predetermined and target powertrain settings include a transmission shift mapping. In some implementations, a number of selectable performance index values between the minimum and maximum performance index values, inclusive, is greater than three. In some implementations, the minimum and maximum performance index values are 0 and 100, and wherein the selected performance index value is an integer value between 0 and 100, inclusive. In some implementations, the input device is a scrollable input device. In some implementations, the scrollable input device is integrated into a steering wheel of the vehicle.

According to another example aspect of the invention, a drive mode control method for a vehicle is presented. In one exemplary implementation, the drive mode control method comprises receiving, by a control system of the vehicle and from an input device of the vehicle, an input from a user of the vehicle, the input being indicative of a selected linear performance index value from a linear range of performance index values between minimum and maximum performance index values, receiving, by the control system the selected linear performance index value, accessing, by the control system, predetermined powertrain settings corresponding to the minimum and maximum performance index values, linearly interpolating, by the control system, between the predetermined powertrain settings corresponding to the minimum and maximum performance index values based on the selected linear performance index value to obtain target powertrain settings, and controlling, by the control system, a powertrain of the vehicle based on the target powertrain settings.

In some implementations, the minimum powertrain index value corresponds to a relative lowest performance powertrain settings or a relative highest efficiency powertrain settings, and the relative performance of the corresponding powertrain settings increases or the relative efficiency of the corresponding powertrain settings decreases as the performance index value increases from the minimum performance index value towards the maximum performance index value. In some implementations, the predetermined and target powertrain settings include an accelerator pedal mapping. In some implementations, the powertrain includes a torque generating system configured to generate torque and a multi-speed transmission configured to transfer the torque from the torque generating system to a driveline of the vehicle, and the predetermined and target powertrain settings further include a transmission shift mapping.

In some implementations, the powertrain includes a torque generating system configured to generate torque and a multi-speed transmission configured to transfer the torque from the torque generating system to a driveline of the vehicle, and the predetermined and target powertrain settings include a transmission shift mapping. In some implementations, a number of selectable performance index values between the minimum and maximum performance index values, inclusive, is greater than three. In some implementations, the minimum and maximum performance index values are 0 and 100, and wherein the selected performance index value is an integer value between 0 and 100, inclusive In some implementations, the input device is a scrollable input device. In some implementations, the scrollable input device is integrated into a steering wheel of the vehicle.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, some vehicles are capable of operating in a wide-array of different manners and efficiencies. In particular, this includes hybrid vehicles having hybrid powertrains including both an internal combustion engine (ICE) and one or more electric motors (capable of operating as ICE-only, motor-only, series and/or parallel hybrid, etc.). While a few select preconfigured drive modes (e.g., Normal, Sport, and Eco) provide some driver customization and flexibility of the vehicle drive mode, there remains an opportunity for improvement in the relevant art. Accordingly, a driver tunable linear drive mode for a vehicle is presented herein. In one exemplary implementation, the vehicle is a hybrid vehicle having a hybrid powertrain comprising an engine/transmission and one or more electric motors, but it will be appreciated that these techniques could also be applicable to ICE-only and electric-only vehicle powertrains (e.g., battery electric vehicles, or BEVs).

The proposed drive mode control systems and methods utilize an input device to receive a user input (e.g., a driver input) for a linear performance index (e.g., a value k ranging from 0 to 100). The input device is configured for quickly and easily receiving a linear input (e.g., sequential numerical input) between minimum/maximum values. Non-limiting examples of the input device include a two-way switch (e.g., actuated up/down or left/right) or a scroller-type or scrollable input device (e.g., a rotary knob or scrollable wheel, such as a steering wheel integrated scroller). Powertrain settings, such as accelerator pedal and transmission shift maps, are calibrated for these minimum and maximum values of the linear performance index. Based on the driver-specified performance index, an interpolation (e.g., a linear interpolation) between these minimum and maximum calibrations is performed to obtain the desired configuration. This allows for reduced storage compared to storing different preconfigured settings for each different performance index. This also allows the driver to quickly switch between different powertrain configuration settings, rather than only a few preconfigured settings or having to search through user interface menus in order to customize specific parameters (e.g., specific transmission gear shift points).

Figure 1:
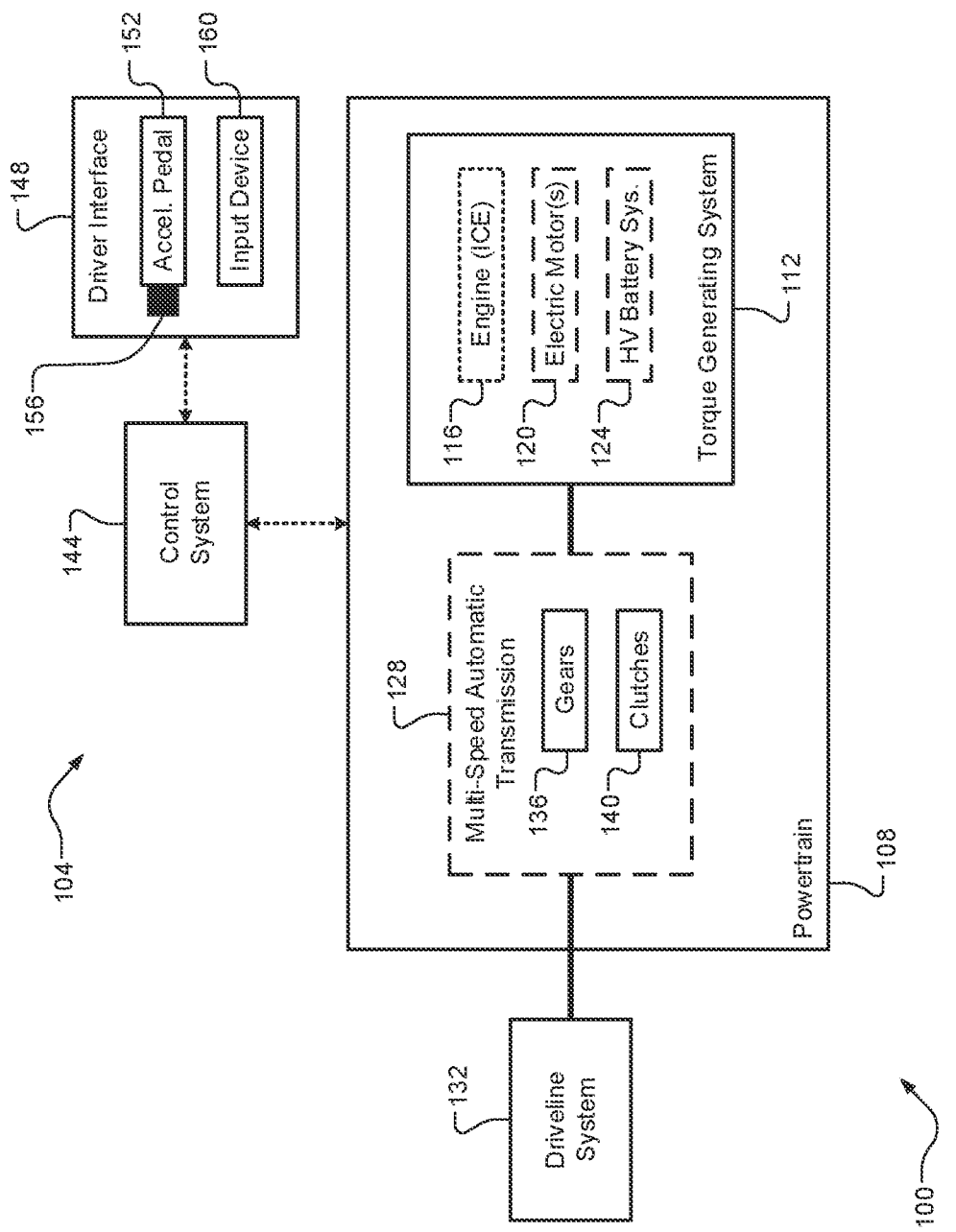
FIG. 1 is a functional block diagram of a vehicle having an example drive mode control system for a driver tunable linear drive mode according to the principles of the present application.

Referring now to FIG. 1, a functional block diagram of a vehicle 100 having an example drive mode control system 104 according to the principles of the present application is illustrated. The vehicle 100 generally includes a powertrain 108 comprising a torque generating system 112 configured to generate torque. The torque generating system 112 could include an internal combustion engine 116, one or more electric motors 120, or some combination thereof. The engine is configured to combust a mixture of air and liquid fuel (gasoline, diesel, etc.) to drive pistons (not shown) and generate torque at a crankshaft or flywheel (not shown). The electric motor(s) 120 are powered by electrical energy (current) supplied by a high voltage battery pack or system 124. In some configurations, the engine 116 could be configured to recharge the battery system 124 via an intermediary motor-generator unit (MGU, not shown) that converts mechanical energy at the engine 116 to electrical energy (current). An optional multi-speed automatic transmission 128 is configured to transfer (e.g., multiply) the torque generated by the torque generating system 112 to a driveline system 132 (half shafts or axles, a differential, etc.) for vehicle propulsion.

The transmission 128 comprises a plurality of gears 136 that are engaged by actuating a set of a plurality of clutches 140. A controller or control system 144 controls operation of the vehicle 100 and, more particularly, the powertrain 108. Specifically, the control system 144 controls the powertrain 108 to generate and transfer a desired amount of drive torque to the driveline system 132 to satisfy a torque request. This torque request could be provided by an operator or driver of the vehicle 100 via a driver interface 148 and, more specifically, an accelerator pedal 152. The accelerator pedal 152 has an accelerator pedal position sensor 156 associated therewith and the accelerator pedal 152 is able to be selectively depressed by the driver between minimum and maximum depression positions. An accelerator pedal mapping is used by the control system 144 to control the torque generating system 112 based on the position of the accelerator pedal 152 as measured by sensor 156. Similarly, a transmission shift mapping is used by the control system 144 to control shifting (e.g., shift timing) of the transmission 128. The control system 144 is also configured to perform at least a portion of the techniques of the present application.

As such, the driver interface 148 further includes an input device 160 configured to receive an input from a user (e.g., the driver) for controlling a drive mode of the vehicle 100. The input device 160 is configured for receiving a linear input (e.g., sequential numerical input) between minimum/maximum values. Non-limiting examples of the input device 160 include a two-way switch (e.g., actuated up/down or left/right) or a scroller-type or scrollable input device (e.g., a rotary knob or scrollable wheel, such as a steering wheel integrated scroller). For example only, a driver of the vehicle 100 could be able to actuate the steering wheel integrated scroller with a single finger or thumb while also maintaining hand control of the steering wheel. The received input is indicative of a selected linear performance index value (hereinafter, "K") from a linear range of performance index values between minimum and maximum performance index values ("$k_{MIN}$ and $k_{MAX}$," respectively). The control system 144 is configured to access (e.g., via a local or remote memory) predetermined powertrain settings corresponding to the minimum/maximum performance index values $k_{MIN}$ and $k_{MAX}$.

The minimum powertrain index value $k_{MIN}$ corresponds to a relative lowest performance (e.g., least aggressive) powertrain settings or a relative highest efficiency powertrain settings. The relative performance of the corresponding powertrain settings increases or the relative efficiency of the corresponding powertrain settings decreases as the performance index value k increases from the minimum performance index value $k_{MIN}$ towards the maximum performance index value $k_{MAX}$. Thus, the maximum powertrain index value $k_{MAX}$ corresponds to a relative highest performance (e.g., most aggressive) powertrain settings or a relative lowest efficiency powertrain settings. By only storing the powertrain settings for these minimum/maximum performance index values $k_{MIN}$ and $k_{MAX}$, the techniques of the present application are able to save significant memory resources compared to storing powertrain settings for all of the various different performance index values. The control system 144 can then perform an interpolation (e.g., a linear interpolation) between the minimum/maximum values $k_{MIN}$ and $k_{MAX}$ based on the selected or target powertrain index value ("$k_{TGT}$").

The total number of k values is greater than three and, in one exemplary implementation, is an integer value between 0 and 100, inclusive. As previously mentioned, two of the specific powertrain settings that are configurable, depending on the configuration of the powertrain 108, are the accelerator pedal mapping and the transmission shift mapping. It will be appreciated that other powertrain settings could also be configurable (e.g., transition points or times between different powertrain modes, such as ICE-only, motor-only, and hybrid). In the examples of accelerator pedal mapping and transmission shift mapping, the settings or data for the end-point cases (corresponding to the minimum/maximum performance index values $k_{MIN}$ and $k_{MAX}$) is initially retrieved and then an interpolation (e.g., linear interpolation) therebetween is performed to determine final or target powertrain settings. For example, this could include some type of average of the two end-point case powertrain settings. Finally, the control system 144 is configured to control the powertrain 108 based on the target powertrain settings to thereby achieve the driver-desired performance/efficiency.

Figure 2:
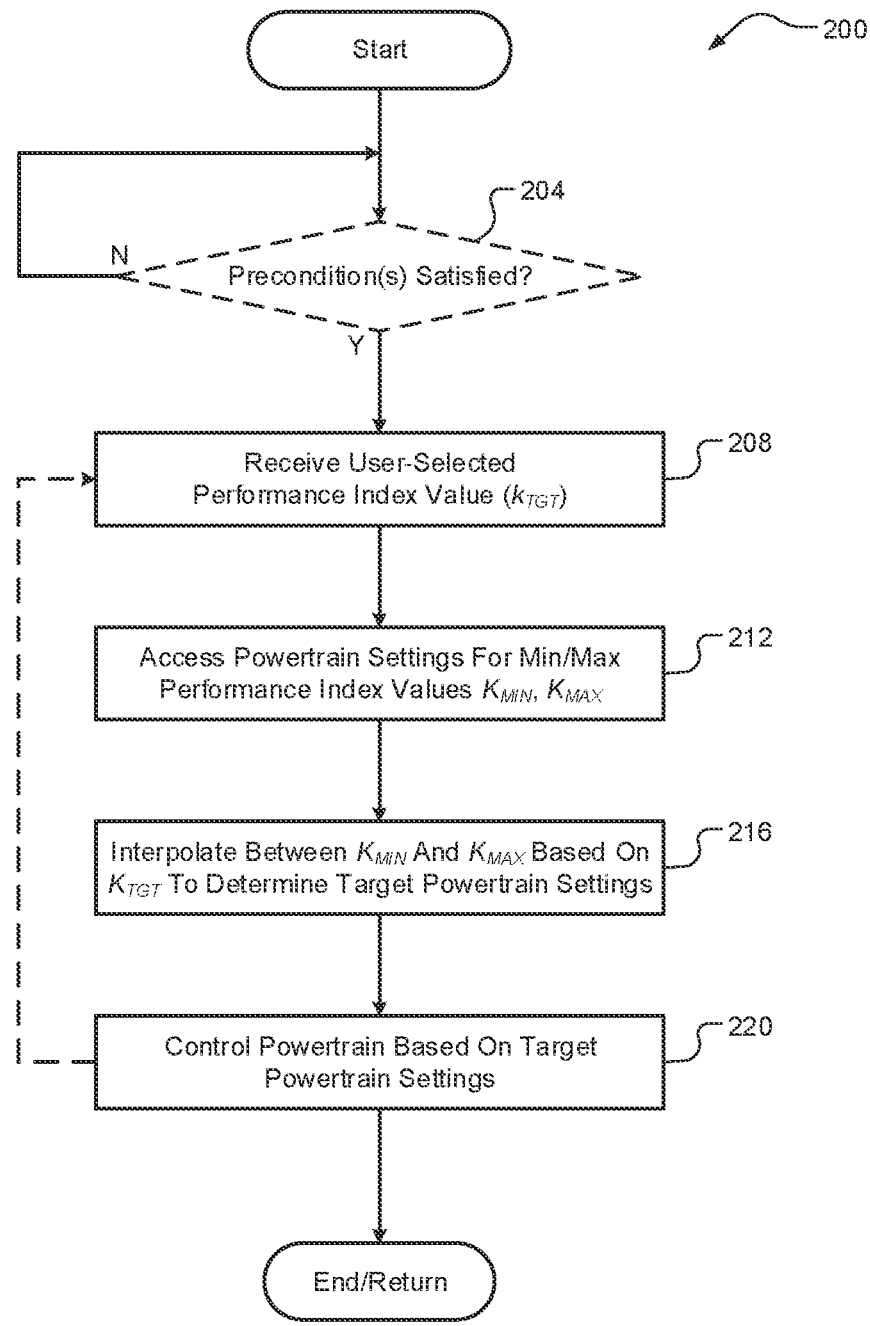
FIG. 2 is a flow diagram of an example drive mode control method for a driver tunable linear drive mode for a vehicle according to the principles of the present application.

Referring now to FIG. 2, a flow diagram of an example drive mode control method 200 for a driver tunable linear drive mode for a vehicle according to the principles of the present application is illustrated. While the vehicle 100 and its components are specifically referenced for descriptive/illustrative purposes, it will be appreciated that the method 200 could be applicable to any suitably-configured vehicle. At 204, the control system 144 determines whether an optional set of one or more preconditions are satisfied. This could include, for example only, the vehicle 100 and the powertrain 108 being powered up and running and there being no malfunctions or faults present that would otherwise inhibit or negatively impact the operation of the techniques of the present application. When false, the method 200 ends or returns to 204. When true, the method 200 proceeds to 208.

At 208, the control system 144 receives a user input (e.g., driver input) via the input device 160 indicating the selected or target performance index value $k_{TGT}$. At 212, the control system 144 accesses the powertrain settings for the minimum and maximum performance index values $k_{MIN}$ and $k_{MAX}$. At 216, the control system 144 interpolates (e.g., linearly interpolates) between the minimum and maximum performance index values $k_{MIN}$ and $k_{MAX}$ based on the target performance index value $k_{TGT}$ to determine the final or target powertrain settings for the drive mode of the vehicle 100. Finally, at 220, the control system 144 controls the powertrain 108 based on the target powertrain settings (e.g., use a corresponding accelerator pedal mapping and/or transmission shift mapping). The method 200 then ends or returns to 208 for further driver tuning (e.g., as the driver continues to adjust the target performance index value $k_{TGT}$ based on their feedback/desire).

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A drive mode control system for a vehicle, the drive mode control system comprising:
   an input device configured to receive an input from a user of the vehicle, the input being indicative of a selected linear performance index value from a linear range of performance index values between minimum and maximum performance index values, wherein a number of performance index values between the minimum and maximum performance index values, inclusive, is greater than three; and
   a control system configured to:
      receive the selected linear performance index value;
      access predetermined powertrain settings corresponding to the minimum and maximum performance index values;
      linearly interpolate between the predetermined powertrain settings corresponding to the minimum and maximum performance index values based on the selected linear performance index value to obtain target powertrain settings; and
      control a powertrain of the vehicle based on the target powertrain settings.

2. The drive mode control system of claim 1, wherein:
   the minimum powertrain index value corresponds to a relative lowest performance powertrain settings or a relative highest efficiency powertrain settings; and
   the relative performance of the corresponding powertrain settings increases or the relative efficiency of the corresponding powertrain settings decreases as the performance index value increases from the minimum performance index value towards the maximum performance index value.

3. The drive mode control system of claim 1, wherein the predetermined and target powertrain settings include an accelerator pedal mapping.

4. The drive mode control system of claim 3, wherein:
   the powertrain includes a torque generating system configured to generate torque and a multi-speed transmission configured to transfer the torque from the torque generating system to a driveline of the vehicle; and
   the predetermined and target powertrain settings further include a transmission shift mapping.

5. The drive mode control system of claim 1, wherein:
   the powertrain includes a torque generating system configured to generate torque and a multi-speed transmission configured to transfer the torque from the torque generating system to a driveline of the vehicle; and
   the predetermined and target powertrain settings include a transmission shift mapping.

6. The drive mode control system of claim 1, wherein the minimum and maximum performance index values are 0 and 100, and wherein the selected performance index value is an integer value between 0 and 100, inclusive.

7. The drive mode control system of claim 1, wherein the input device is a scrollable input device.

8. The drive mode control system of claim 7, wherein the scrollable input device is integrated into a steering wheel of the vehicle.

9. A drive mode control method for a vehicle, the drive mode control method comprising:
- receiving, by a control system of the vehicle and from an input device of the vehicle, an input from a user of the vehicle, the input being indicative of a selected linear performance index value from a linear range of performance index values between minimum and maximum performance index values, wherein a number of performance index values between the minimum and maximum performance index values, inclusive, is greater than three;
- receiving, by the control system, the selected linear performance index value;
- accessing, by the control system, predetermined powertrain settings corresponding to the minimum and maximum performance index values;
- linearly interpolating, by the control system, between the predetermined powertrain settings corresponding to the minimum and maximum performance index values based on the selected linear performance index value to obtain target powertrain settings; and
- controlling, by the control system, a powertrain of the vehicle based on the target powertrain settings.

10. The drive mode control method of claim 9, wherein:
- the minimum powertrain index value corresponds to a relative lowest performance powertrain settings or a relative highest efficiency powertrain settings; and
- the relative performance of the corresponding powertrain settings increases or the relative efficiency of the corresponding powertrain settings decreases as the performance index value increases from the minimum performance index value towards the maximum performance index value.

11. The drive mode control method of claim 9, wherein the predetermined and target powertrain settings include an accelerator pedal mapping.

12. The drive mode control method of claim 11, wherein:
- the powertrain includes a torque generating system configured to generate torque and a multi-speed transmission configured to transfer the torque from the torque generating system to a driveline of the vehicle; and
- the predetermined and target powertrain settings further include a transmission shift mapping.

13. The drive mode control method of claim 9, wherein:
- the powertrain includes a torque generating system configured to generate torque and a multi-speed transmission configured to transfer the torque from the torque generating system to a driveline of the vehicle; and
- the predetermined and target powertrain settings include a transmission shift mapping.

14. The drive mode control method of claim 9, wherein the minimum and maximum performance index values are 0 and 100, and wherein the selected performance index value is an integer value between 0 and 100, inclusive.

15. The drive mode control method of claim 9, wherein the input device is a scrollable input device.

16. The drive mode control method of claim 15, wherein the scrollable input device is integrated into a steering wheel of the vehicle.

17. A drive mode control method for a vehicle, the drive mode control method comprising:
- receiving, by a control system of the vehicle and from an input device of the vehicle, an input from a user of the vehicle, the input being indicative of a selected linear performance index value from a linear range of performance index values between minimum and maximum performance index values, wherein the minimum and maximum performance index values are 0 and 100, and wherein the selected performance index value is an integer value between 0 and 100, inclusive;
- receiving, by the control system, the selected linear performance index value;
- accessing, by the control system, predetermined powertrain settings corresponding to the minimum and maximum performance index values;
- linearly interpolating, by the control system, between the predetermined powertrain settings corresponding to the minimum and maximum performance index values based on the selected linear performance index value to obtain target powertrain settings; and
- controlling, by the control system, a powertrain of the vehicle based on the target powertrain settings.

\* \* \* \* \*